Patented May 5, 1953

2,637,736

UNITED STATES PATENT OFFICE 2,637,736

PROCESS FOR MANUFACTURE OF HIGH MOLECULAR WEIGHT ESTER FROM WATER MISCIBLE ALCOHOL

Richard E. Merz, Bayonne, N. J., assignor to Standard Oil Development Company, a corporation of Delaware No Drawing. Application August 29, 1950, Serial No. 182,139

5 Claims. (Cl. 260—410.9)

This invention relates to an improved process for the manufacture of oil-soluble type esters from high molecular weight acids, such as oleic acid, and a water-miscible alcohol, such as isopropyl alcohol, in the presence of an acidic esterification catalyst.

Up until recently it was found difficult to esterify high molecular weight organic acids, such as $C_{12}$–$C_{18}$ acids, with low molecular weight water-miscible alcohols, because such ester products are relatively non-volatile; and, therefore, they do not assist in removing water formed by reaction by distillation as in the formation of lower molecular weight esters. For that reason, it was considered necessary to employ alcohol reactant or extraneous liquids which are insoluble in water and distill with water during the esterification, for example, such liquids as benzene, or naphtha hydrocarbons. However, in using extraneous liquids to assist in removal of water from the esterification zone, the esterification rate is adversely affected and there are a number of other difficulties which arise in recovering and purifying the ester products. For that reason there was less development in the production of the high molecular weight esters from water-miscible alcohols than from higher alcohols which are not completely miscible with water, such as butanols, etc. Nevertheless, the higher alcohols are less available; they form esters which are less suitable for certain purposes; and they give increased difficulties in purification. It will be readily appreciated by those skilled in the art that the esterification with a water-miscible alcohol of the high molecular weight organic acids essentially involves different conditions and considerations than are involved in using an alcohol which becomes separated from water.

The completely water-miscible alcohols, e. g., methyl-, ethyl-, isopropyl alcohol, and tertiary butanol, are difficult to obtain completely anhydrous and are more practically available with some water present, i. e., with at least about one volume percent of water present. For the purpose of the invention it is important to use the alcohol with no more than 4 volume percent water, i. e., of an alcohol concentration between 96 and 100% of its volume, more preferably about 99 volume percent, and in using such an alcohol it is important to employ a step-wise treatment in order to limit the amount of water and maintain the proper amount of the alcohol in the esterification zone at all times throughout the esterification reaction. Hence, only a portion of the alcohol is mixed with the acid in an initial period, and then additional portions of the alcohol are supplied for completing the esterification after water has been removed with some of the alcohol from a first stage product and successive stage products.

During the esterification, water-entraining agents which are partly or completely insoluble in water are excluded in order to achieve the various advantages which will be made apparent. Such entraining agents considerably reduce the capacity of the esterification unit, lengthen the time of reaction, require larger amounts of catalyst, yet tend to give poorer yields or ester products of lower purity.

In using alcohols or water-entraining agents which are not completely soluble in water, such materials are much more difficult to remove from the ester product than are the water-soluble alcohols; and their use, therefore, necessitates complicated finishing steps which tend to result in a lower quality product or involve substantial losses of product. Procedural steps employed in the method of the present invention will be described and compared with the method that employs a water-immiscible entraining agent as set forth in the following examples:

*Example 1.—Method employing water-immiscible entraining agent*

The following proportions of materials were used:

5170 lbs. oleic acid.
3340 lbs. 91 volume percent isopropyl alcohol.
427 gal. naphtha (entraining agent).
70 lbs. sulfuric acid 98% strength.

The reactants were mixed in a 2000 gallon glass lined reactor, equipped with a mechanical agitator, thermometer, and reflux line. The temperature of the mixture was raised until reflux was reached at 185° F.–190° F. and maintained thereat until an acid neutralization number of 10 was attained. Water of esterification was removed from the reaction mixture by settling in a decanter placed in the reflux return line. The esterification was relatively slow, taking approximately 24 to 27 hours for the batch. The reaction mixture was neutralized and water washed to separate the mineral acid catalyst and unreacted organic acid from the ester product. The naphtha solvent then had to be removed by vacuum distillation at 190° F.–200° F. under 7″ mercury absolute pressure. These finishing steps required another 18–20 hours for completion of a batch, making the total time for one batch about 45–48 hours. The yield of 720 gallon ester product by this method averaged only 87.5 of theoretical.

(NOTE.—Neutralization number is mg. KOH required to neutralize 1 gm. of material).

*Example 2.—Method of present invention*

The following proportions of materials were used:

6164 lbs. oleic acid.
7848 lbs. 99 volume percent isopropyl alcohol.
50 lbs. sulfuric acid 98% strength.

The oleic acid and ½ the amount of alcohol were mixed in the 2000 gal. glass lined reactor. The sulfuric acid was added, and the reaction mixture was heated to reflux at 185° F.–190° F. until an acid neutralization number of 50–52 was reached. Then, ⅓ of the alcohol was removed from the reactor by distillation, and a volume of 99% isopropyl alcohol equivalent to that removed was charged to the reactor. The procedure was repeated until acid neutralization numbers 34, 17, and finally 10 were reached. The entire esterification of the batch of oleic acid required only 10–12 hours for completion. The reaction mixture was then neutralized, water washed, and blown dry at 150° F. under vacuum, amounting to 7″ mercury absolute pressure. The finishing step required only 12 to 14 hours, making the total time approximately 24 hours for the batch. The yield of 930 gallon product by this method averages 94% of theoretical.

Thus, by using the procedure of the present invention, as described in Example 2, which eliminates the water-immiscible entrainer and employs the alcohol containing smaller amounts of water in stages, the reaction time is cut in half, the reactor capacity is increased by 25%, and the yield of product is increased by 6%.

The detailed description given in the foregoing Example 2 is intended to be illustrative only, since the process can be modified or varied without departing from the spirit of the invention. The varieties of fatty acids which can be subjected to the esterification include the saturated fatty acids, such as lauric, myristic, and stearic; unsaturated fatty acids, such as dodecylenic, palmitoleic, oleic, resinolenic, linoleic; and substituted fatty acids, such as dichlorostearic acid. Other organic acids such as naphthenic or aromatic may be used, but not as well. The conventional types of acidic esterification catalysts may be used, but it is generally preferred to use concentrated sulfuric acid of 94 to 100% strength. The different water-soluble alcohols, such as ethyl alcohol, may be used for the esterification in place of the isopropyl alcohol or methyl alcohol, or mixtures of such alcohols may be used, following the same general procedure outlined.

In general the steps are as follows:

(1) Charge between 2 and 4 moles, preferably 3 moles, of the water-miscible alcohol which is as close to anhydrous as is practical per mole of the organic acid and the esterification catalyst (preferably between 96–100% $H_2SO_4$).

(2) Reflux for a period until part of the organic acid is esterified (0.5–0.8 hour until neutralization number of about 53 or lower is obtained).

(3) Distill off about 1 mole of the alcohol which has become diluted by water formed in the esterification.

(4) Recharge 1 mole of fresh alcohol (96–100%).

(5) Repeat refluxing for further esterification (0.5–0.8 hour until neutralization number of about 34 or lower is obtained).

(6) Distill off 1 mole of diluted alcohol.

(7) Recharge 1 mole of fresh alcohol (96–100%).

(8) Reflux for further esterification (0.5 to 0.8 hour until a neutralization number of about 17 or lower is obtained).

(9) Distill off 1 mole of dilute alcohol.

(10) Recharge one mole of fresh alcohol (96–100%).

(11) Reflux for further esterification until at least 90% of the organic acid is esterified (about 0.5 to 0.8 hour) with about 2 to 3 moles of alcohol present per mole of organic acid charged.

(12) Distill off about 1–2 moles of diluted alcohol.

(13) Neutralize, water wash, and dry to recover pure ester product.

It is to be noted that the process involves a total addition of about 6 moles of the so-called fresh alcohol reactant (96–100%) for the esterification of one mole of the organic acid, which is monocarboxylic; but as reaction proceeds in the esterification zone, only about 3 moles but not less than 2 moles of the alcohol are present per mole of the organic acid used. The amount of alcohol added in the initial stage or present at any of the stages is critical, because if substantially more than 3 moles of alcohol are present per mole of the initial organic acid reactant there is a tendency to introduce too much water into the system with the result that the time will be increased and capacity lowered. The fresh alcohol added initially or charged between the stages should be as anhydrous as is practical, preferably about 99% by volume of alcohol and definitely with less than 4 volume per cent of water present. In each stage the esterification is allowed to proceed substantially to equilibrium. After the organic acid has been esterified to as near completion as is practical, i. e., to at least 90% of theoretical, some of the remaining unreacted alcohol is recovered by distillation from the thus obtained esterification product, but a substantial amount of the unreacted alcohol is permitted to remain with the esterificaion product which is next subjected to neutralization. It is highly important to use a plurality of stages of esterification with this method as indicated, for otherwise the reaction would reach an equilibrium far short of adequate esterification, so that at the end an excessive amount of unesterified organic acid would remain which would give further difficulty in purifying the ester, since the neutralized organic acid tends to solubilize the ester in the aqueous washing media. Thus, in general, it has been found desirable to have at least three stages of esterification with intermediate replacement of a portion of the unreacted alcohol by a charge of similar volume of fresh alcohol having less water.

*Example 3.—Preparation of methyl oleate*

The following amounts of materials were used:

566 grams oleic acid.
384 grams methyl alcohol (98.5).
3 grams concentrated sulfuric acid.

The oleic acid and one half the amount of alcohol were mixed in a glass reactor. The sulfuric acid was added and the reaction mixture was heated to reflux at 165° F. After 30 minutes of reflux 64 grams of methyl alcohol and water was distilled overhead. 64 grams fresh methyl alcohol was charged to the reactor and the procedure repeated five times. The reaction mixture was then neutralized with aqueous sodium carbonate, water washed, and dried by blowing with air under vacuum at 150° F. 480 grams of methyl oleate was obtained as product.

Although with the procedure of the present invention the amount of alcohol used per batch of product is relatively high, the alcohol is readily recovered in concentrated form, because the alcohol distilled off at the end of each stage of esterification tends to have a lower water content than is present in the normal binary aqueous azeotrope for the alcohols that form azeotropes. For example, the isopropyl alcohol distilled at the end of the first stage will be about 91 volume per cent, then above 92 and close to 96 volume per cent in succeeding stages, so that more concentrated alcohol, e. g., 99% isopropyl alcohol, can be fractionally distilled from such distillates. Taking all cost factors into consideration, the process of the present invention makes a substantial cost reduction of the order of 16% as compared to a method that uses a water-immiscible entrainer. The cost of the concentrated alcohol is a relatively minor item.

As already mentioned, the present invention is adapted for a highly efficient finishing treatment, particularly if the proper finishing steps are used. Unlike other finishing procedures used on the esterification product involving a water-immiscible alcohol or water-immiscible solvent for entraining agent, it is advantageous with the present method to have the esterification product retain a substantial amount of unreacted alcohol and then be neutralized with an alkaline aqueous solution, such as an aqueous solution of soda ash ($Na_2CO_3$). Similarly an aqueous caustic solution may be used but preferably in an apparatus which does not have a glass lining but is resistant to corrosion by the aqueous caustic. The neutralization thus converts both residual organic acid and mineral acid to their salts. The retained alcohol prevents the formation of emulsions by the salts of the organic acids. Then, the subsequent water washing readily removes any residual salts and alcohol from the ester product so that subsequently an easily performed drying of the ester can be carried out simply by blowing the washed ester with air or any other gas which does not react with the ester at moderately elevated temperatures of about 150° F., whereas in using water immiscible solvents higher temperatures and much longer separation treatments are required; and such more drastic treatments tend to cause decomposition of the ester product. In exemplary finishing treatments the ester products containing approximately ½ to 1½ moles of unreacted water-soluble alcohol per mole of ester is washed three times with a five weight percent soda ash solution (100–200 gal. soda ash solution for approximately 1000 gal. ester), and then is washed twice with approximately 5 to 10 volume percent of water before being air-blown at 150° F. under vacuum. The satisfactory ester products have been found to be compounds having important properties for use as oiliness agents and gum solvents in petroleum products such as motor fuels, diesel oils, and lubricating oils. They are also useful as plasticizers in lacquer formulations and plastics.

Having described the invention, it is claimed:

1. The process for esterifying oleic acid with isopropyl alcohol in the presence of an acidic esterification catalyst which comprises forming a reaction mixture of between 2 and 4 moles of isopropyl alcohol containing between 96 and 100% by volume of alcohol content per mole of the oleic acid, repeatedly esterifying the oleic acid in stages with added portions of said alcohol replacing alcohol distilled until nearly all oleic acid is esterified, intermittently between the stages removing alcohol and water formed from the reaction mixtures; neutralizing the esterification product with a portion of the alcohol retained therein, water washing the neutralized esterification product, and drying the washed isopropyl oleate ester thus produced.

2. In a process for the manufacture of high boiling aliphatic esters by reaction of a higher fatty acid with a water-miscible alcohol containing less than 4% by volume of water, the improvement which comprises intermittently removing water formed by the esterification reaction from the esterification reaction mixture by distilling the water with part of the alcohol, more water being removed with the alcohol than is present in the initial alcohol reactant and replacing the alcohol thus distilled by an additional charge of the alcohol containing less than 4 volume percent water, each of said charges of alcohol being used for a partial esterification of the fatty acid, and maintaining from 2 to 3 moles of the alcohol per mole of the fatty acid reacted in the reaction mixture as the reaction nears completion.

3. In a process of manufacturing high boiling aliphatic esters by reaction of a $C_{12}$–$C_{18}$ fatty acid in the presence of an acidic esterification catalyst with a water-miscible alcohol having less than 4 percent water but in the absence of a water-immiscible entraining agent, the improvement which comprises removing water formed in the esterification reaction by distillation with a portion of the alcohol, replacing the alcohol distilled by fresh charges of alcohol having less than 4 volume percent of water, each fresh charge of alcohol being used for a partial esterification of the fatty acid after a step of removing some of the more aqueous alcohol and water, neutralizing the resulting esterification product containing a substantial portion of the alcohol remaining unreacted, washing the ester free of resulting salts formed in the neutralization, then removing moisture from the washed ester.

4. The process for esterifying oleic acid with isopropyl alcohol in the presence of sulfuric acid as the esterification catalyst, which comprises forming a reaction mixture consisting of 3 moles of 99 volume per cent isopropyl alcohol per mole of the oleic acid with the sulfuric acid catalyst of 96–100% strength, heating said reaction mixture to a temperature in the range of 185° F. to 190° F.; refluxing the alcohol vaporized from the reaction mixture during an initial partial esterification stage, distilling off 1 mole of the alcohol increased in content of water by esterification, charging to the reaction mixture a mole of 99% isopropyl alcohol, continuing esterification under reflux for a second stage, repeating replacement of the alcohol that becomes diluted by water from the esterification with fresh 99% isopropyl alcohol until at least 90% of the organic acid is esterified, distilling from the resulting esterification mixture a portion of the alcohol, neutralizing the esterification mixture in which ½ to 1½ moles of the unreacted alcohol is retained per mole of the ester, water washing the neutralized esterification product to obtain the washed ester, then drying the washed ester by blowing with air at temperatures up to about 150° F. under vacuum.

5. In a process for the manufacture of a high molecular weight ester by esterification of a higher fatty acid with a water-miscible alcohol in the presence of an acidic esterification catalyst, the improvement which comprises forming a reaction mixture by admixing with the fatty acid a portion of the alcohol to be used for the esterification, the alcohol thus used being a relatively dry alcohol containing less water than is present in vapor compositions of the alcohol subsequently distilled with water from the resulting esterified fatty acid in the reaction mixture; carrying out a partial esterification of the fatty acid in said reaction mixture at the boiling temperature of the alcohol with refluxing of the alcohol vaporized from the reaction mixture in which water formed by the partial esterification is accumulated; subsequently distilling from the partial esterification reaction mixture a substantial amount of the alcohol left unreacted and of the water which was accumulated during the partial esterification; adding to the partial esterification mixture from which said accumulated water and unreacted alcohol have been distilled another portion of the relatively dry alcohol to replace the alcohol distilled therefrom; effecting further esterification of unreacted fatty acid present in the partially esterified fatty acid reaction mixture with the added portion of relatively dry alcohol; subsequently distilling more unreacted alcohol and water accumulated in said reaction mixture; and thereafter when esterification of the fatty acid is practically completed, purifying and recovering the ester.

RICHARD E. MERZ.

References Cited in the file of this patent

UNITED STATES PATENTS

| Number | Name | Date |
|---|---|---|
| 1,659,790 | Starrels | Feb. 21, 1928 |
| 1,864,893 | Crowell et al. | June 28, 1932 |
| 2,076,111 | Bannister | Apr. 6, 1937 |